Dec. 11, 1923.
C. BOUILLON
1,476,685
PROCESS FOR THE TREATMENT OF RESIDUAL WATERS
Filed June 29, 1920
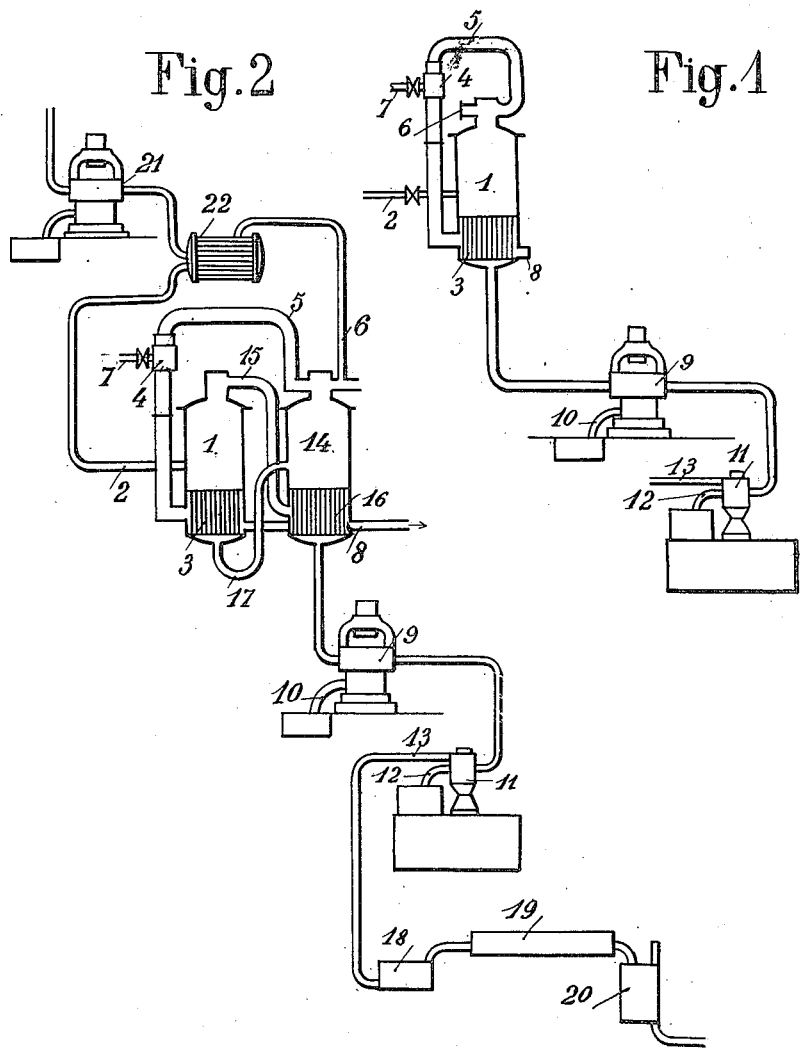
INVENTOR
Charles Bouillon,
BY Townsend & Decker
ATTORNEYS Patented Dec. 11, 1923.

1,476,685

UNITED STATES PATENT OFFICE.

CHARLES BOUILLON, OF PARIS, FRANCE.

PROCESS FOR THE TREATMENT OF RESIDUAL WATERS.

Application filed June 29, 1920. Serial No. 392,876.

*To all whom it may concern:*

Be it known that I, CHARLES BOUILLON, a citizen of the French Republic, and a resident of Paris, France, have invented a new and useful Process for the Treatment of Residual Waters (for which I have filed an application in France on March 9th, 1914, Patent No. 475,639), of which the following is a specification.

This invention has for its object a process for the treatment of residual waters however derived which contain fatty or soapy matters and particularly residual waters obtained from washing wool and other animal fibres.

It is known that a wool washing process for freeing it from the foreign matters which it contains comprises first a washing with water or scouring and then a systematic stirring in soapy water.

The residual waters passing away after the stirring operation therefore contain all the grease in the wool, the fatty acids contained in the soap and the mineral matter of the soap as well as all foreign matters such as earth, sand, fecal matters, etc., and also such mineral matters as are not extracted by the first wash in cold water.

Usually these waters are merely allowed to flow into rivers and not only are the fatty matters from the wool and all the soap employed lost but the rivers are polluted.

It has already been proposed to treat the residual wash waters with a view to purifying them and recovering matters having a mercantile value. The process most commonly employed is an acid treatment which consists in treating the residual waters with sulphuric acid; this process is relatively costly and does not from a hygienic point of view fulfil its object; the waters are, it is true, freed from fatty matters, but are charged with acid which must in practice be neutralized.

It has also been proposed to recover the products contained in the residual waters by concentrating and separating the water in the form of condensed steam as distilled water; the residue could then be treated physically or chemically for obtaining the different elements composing it. Such process however has not given satisfactory results as the residual waters contain fatty matters which solidify at about 40°–50° C. In order however to obtain suitable evaporation multiple effect apparatus must be employed which partly work with a vacuum. As the object of the evaporation is to separate the water from the grease, it happens that in these apparatus the temperature of the steam and of the liquids becomes less as concentration increases and therefore when the liquid has been freed from the major portion of its water it is near to the solidifying point of the fatty matters or even below this point. Evaporation is then no longer possible, the transmission of heat cannot be effected and the apparatus becomes clogged. The multiple effect apparatus must therefore be able to work at a higher temperature, but for this purpose it can no longer work with a vacuum and the number of effects which can be employed in the evaporating apparatus will be considerably diminished. The economy of the apparatus will thus be small for it will comprise only one or two effects and will require a large air pump requiring great power.

The process which forms the subject of the present invention obviates these objections and allows the residual wash waters from wool or other similar waters to be treated economically.

According to this invention the evaporation of the liquids to be treated is effected at a temperature greater than the temperature of solidification of the grease which it contains with the aid of compression of the steam.

The grease on the one hand and the soapy water on the other is separated by centrifugal action or natural decantation at a temperature always greater than that of the solidification of the grease.

The soapy water may then be treated for the separation of its elements (fatty acid and mineral salts).

This process required neither condenser, water or air pump.

The evaporation is preferably carried out at about atmospheric pressure and at a temperature of 100° C. in order to prevent fermentations which might take place at lower temperatures and give rise to a considerable liberation of incondensible gas particularly ammonia.

The employment of a temperature considerably greater than that of the fusion of the grease allows the heat to be better transmitted in the apparatus by reason of the diminution of the viscosity of the greasy waters. The water removed from the residual waters in the form of distilled water is then immediately employed for a fresh washing of wool, for example.

Evaporation by compression of the steam is advantageously carried out according to a known principle by which the steam formed by the evaporation of the liquid to be concentrated is compressed by a fan, for example, into a heating chamber in which the liquid to be evaporated is heated.

The evaporation of the residual waters will thus be carried out in so to speak a gratuitous manner by means of the energy contained in the heating steam of the water which is employed to wash the wool. This energy transformed in the steam compressing apparatus allows concentration of the residual water to be effected and to obtain by reason of such evaporation water distilled at 100° C.

Finally the soapy waters after their evaporation together with the greasy matters may be decomposed into their elements as described in my Patent 1,410,882, granted Mar. 28, 1922, for "Process for the decomposition of soapy waters."

The invention is illustrated in the accompanying drawing in which Figures 1 and 2 show two methods of carrying out the invention.

In Figure 1, 1 is any evaporator; the liquid to be concentrated is led through the pipe 2 into the evaporator 1; steam at about 100° C. contained in the evaporator 1 is led into the heating chamber 3 at a temperature of 103° C. for example through a pipe 5 by the aid of continuous compressing apparatus such as for example a compressor 4 similar to that described in the French Patent No. 380,419 of the 5th October, 1906, or any other equivalent apparatus for example a rotary compressor.

6 is an outlet pipe for the excess of steam, 7 is an inlet for live steam to the compressor and 8 is the outlet for the distilled water at 100° C.

Of course in place of a simple effect apparatus such as illustrated in the drawing there may be a double or a triple or quadruple effect apparatus according to the quantities of water to be evaporated and the output of the apparatus.

The concentrated liquid which passes out from the evaporator 1 at a temperature greater than that of solidification of the grease passes into one or more centrifugal filters 9 in which the sediment consisting of insoluble matter, sand, fecal matters, wool waste, etc., separates from the greasy and soapy water and passes away through 10. These various matters may of course be removed before the concentration of the soapy waters or their elimination may take place partly before concentration and finally after concentration.

The sediment thus separated is dried for example by utilizing the waste heat of the factory.

The waters still at a temperature greater than that of the solidification of the grease and which contain grease and soaps are then delivered into one or more centrifugal separators 11 which separate the grease delivered at 12 from the soapy waters passing out at 13.

The higher the temperature the more easily the separation of the grease is effected. The temperature of the fatty waters being at their outlet from the evaporator near to 100° C. is therefore particularly suitable for the separation of grease and soapy waters.

These latter freed from grease may then be treated or utilized in any suitable manner. In Figure 2 there is indicated apparatus of this type combined for example with an apparatus for the decomposing of soapy waters according to the process previously mentioned.

In this figure there is illustrated a double effect evaporating apparatus of which 1 and 14 are the two evaporators. Steam at 103° C. which passes from the evaporator 1 passes by the pipe 15 into the heating chamber 16 of the evaporator 14 where it heats to about 100° C. and at atmospheric pressure the liquid to be concentrated which passes from 1 through the pipe 17 to the evaporator 14. Steam at 100° C. and at a pressure of 760 millimetres of mercury passing out from the evaporator 14 is led back by the compressor 4 by reason of the pipe 5. The same apparatus in rear of the evaporating apparatus are provided as before.

The soapy waters passing out through the pipe 13 are compressed by the pump 18 and delivered into a mixer 19 where decomposition takes place under the action of carbonic acid preferably with heat. There is recovered in the vessel 20 both fatty acids and a solution of potassium carbonate or sodium carbonate which is concentrated and then calcined in a furnace. The furnace usually installed for calcining the concentrated solution of potash salts derived from the previous washing of the wool in cold water with a view to scouring may be utilized for this purpose.

The fatty acids uncontaminated with carboniferous matters may be again saponified for the preparation of soapy waters intended for washing wool. In Figure 2 it is also indicated how the liquid to be concentrated may before its entrance into the evaporator be freed from insoluble matters, sand, fecal matters, etc., which it contains, by treatment in one or more centrifugal filters 21 and then again heated by the steam passing through the pipe 6 into the re-heater 22.

Distilled water derived from the several evaporations is advantageously employed for the preparation of the soapy wash water and for the previous washing of the wool in soapy water.

Certain factories in place of employing soap employ merely sodium carbonate. In this case the process is the same except in so far as it relates to the waters freed from grease which in this case only contain sodium carbonate; the product merely requires calcining to be recovered.

What I claim is:—

1. A process of treating residual waters containing greasy and soapy matters, consisting in first concentrating the waters by evaporation, compressing the steam derived from the evaporation and then centrifugalizing the concentrated residual waters to separate the soapy waters from the greases, the evaporation and centrifugation taking place at a temperature higher than the solidifying temperature of the grease.

2. A process of treating residual waters containing soapy and greasy matters, which consists in first concentrating these waters by evaporation, compressing all of the steam produced by evaporation and then centrifugalizing the concentrated residual waters to separate the greasy matters from the soapy waters, the centrifugation and the evaporation taking place at a temperature higher than the solidifying temperature of the grease.

3. A process of treating residual waters containing soapy and greasy matters, which consists in first concentrating these waters by evaporation, compressing the steam produced by the evaporation and then centrifugalizing the concentrated residual waters to separate the greasy matters from the soapy waters, the centrifugation and the evaporation taking place at a temperature higher than the solidifying temperature of the grease.

4. A process of treating residual waters containing greasy and soapy matters, consisting in first concentrating these waters by evaporation by means of the expansion power of the heating steam of the waters used for washing wools, compressing the steam derived from the evaporation and then centrifugalizing the concentrated residual waters to separate the greases from the soapy waters, the evaporation and centrifugation taking place at a temperature higher than the solidifying temperature of the greases.

5. A process of treating residual waters containing greasy and soapy matters, consisting in first concentrating the waters by evaporation, compressing the steam derived from the evaporation and then centrifugalizing the concentrated residual waters to separate the soapy waters from the greases, the evaporation and centrifugation taking place at a temperature higher than the solidifying temperature of the grease and further, and in treating the soapy waters in such a manner so as to separate the fatty acids thereof from other mineral salts.

In testimony whereof I have signed this specification.

CHARLES BOUILLON.